United States Patent
Zappella et al.

(10) Patent No.: US 10,977,149 B1
(45) Date of Patent: Apr. 13, 2021

(54) OFFLINE SIMULATION SYSTEM FOR OPTIMIZING CONTENT PAGES

(71) Applicant: Amazon Technologies, Inc., Seattle, WA (US)

(72) Inventors: Giovanni Zappella, Berlin (DE); Cédric Philippe Charles Jean Ghislain Archambeau, Berlin (DE); Edward Thomas Banti, Berlin (DE); Michael Brueckner, Berlin (DE); Borys Marchenko, Berlin (DE); Martin Milicic, Berlin (DE); Jurgen Ommen, Berlin (DE); Dmitrij Scsadej, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 484 days.

(21) Appl. No.: 15/925,607

(22) Filed: Mar. 19, 2018

(51) Int. Cl.
*G06F 11/34* (2006.01)
*G06F 16/957* (2019.01)

(52) U.S. Cl.
CPC ...... *G06F 11/3457* (2013.01); *G06F 11/3438* (2013.01); *G06F 16/957* (2019.01)

(58) Field of Classification Search
USPC .............................. 703/22, 24, 2; 706/2, 12
See application file for complete search history.

(56) References Cited

U.S. PATENT DOCUMENTS

| | | | |
|---|---|---|---|
| 5,020,112 A * | 5/1991 | Chou | G06K 9/6885 |
| | | | 382/226 |
| 8,628,331 B1 * | 1/2014 | Wright | G09B 19/00 |
| | | | 434/236 |
| 10,142,204 B2 * | 11/2018 | Nickolov | H04L 43/0817 |
| 10,467,274 B1 * | 11/2019 | Ren | G06K 9/4604 |
| 10,608,911 B2 * | 3/2020 | Nickolov | H04L 43/0817 |
| 10,726,059 B1 * | 7/2020 | Ren | G06K 9/00973 |
| 2003/0086536 A1 * | 5/2003 | Salzberg | H04M 3/22 |
| | | | 379/15.02 |
| 2006/0111880 A1 * | 5/2006 | Brown | G06F 8/20 |
| | | | 703/1 |
| 2011/0288877 A1 * | 11/2011 | Ofek | G06Q 10/10 |
| | | | 705/2 |
| 2014/0106318 A1 * | 4/2014 | Wright | G09B 7/02 |
| | | | 434/219 |
| 2015/0235143 A1 * | 8/2015 | Eder | G16H 50/50 |
| | | | 706/12 |
| 2017/0034023 A1 * | 2/2017 | Nickolov | H04L 43/0817 |
| 2019/0097907 A1 * | 3/2019 | Nickolov | G06F 8/65 |
| 2020/0021620 A1 * | 1/2020 | Purathepparambil | H04L 63/205 |
| 2020/0126126 A1 * | 4/2020 | Briancon | G06Q 30/0269 |
| 2020/0204468 A1 * | 6/2020 | Nickolov | H04L 63/1433 |

* cited by examiner

*Primary Examiner* — Thai Q Phan
(74) *Attorney, Agent, or Firm* — Knobbe Martens Olson & Bear LLP

(57) ABSTRACT

A testing environment in which offline simulations can be run to identify policies and/or prediction models that result in more valuable content being included in content pages is described herein. For example, the offline simulations can be run in an application executed by an experiment device using data gathered by a production content delivery system. The simulation application can test any number of different policies and/or prediction models without impacting users that use a production content delivery system to request content.

20 Claims, 6 Drawing Sheets

OFFLINE SIMULATION SYSTEM FOR OPTIMIZING CONTENT PAGES

BACKGROUND

Content pages (e.g., a network page, web page, etc.) are commonly generated dynamically in response to page requests from user devices. The content of the generated content page can vary based on various factors, such as attributes of the user device, a context of the current browsing session, actions performed by the user in prior browsing sessions, and/or the like. Ideally, the content selected to be included in a generated content page is of value for presenting to the user operating the user device. However, it can be difficult to identify valuable content to include in a content page in a timely manner and without losing users and/or otherwise degrading the user experience.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
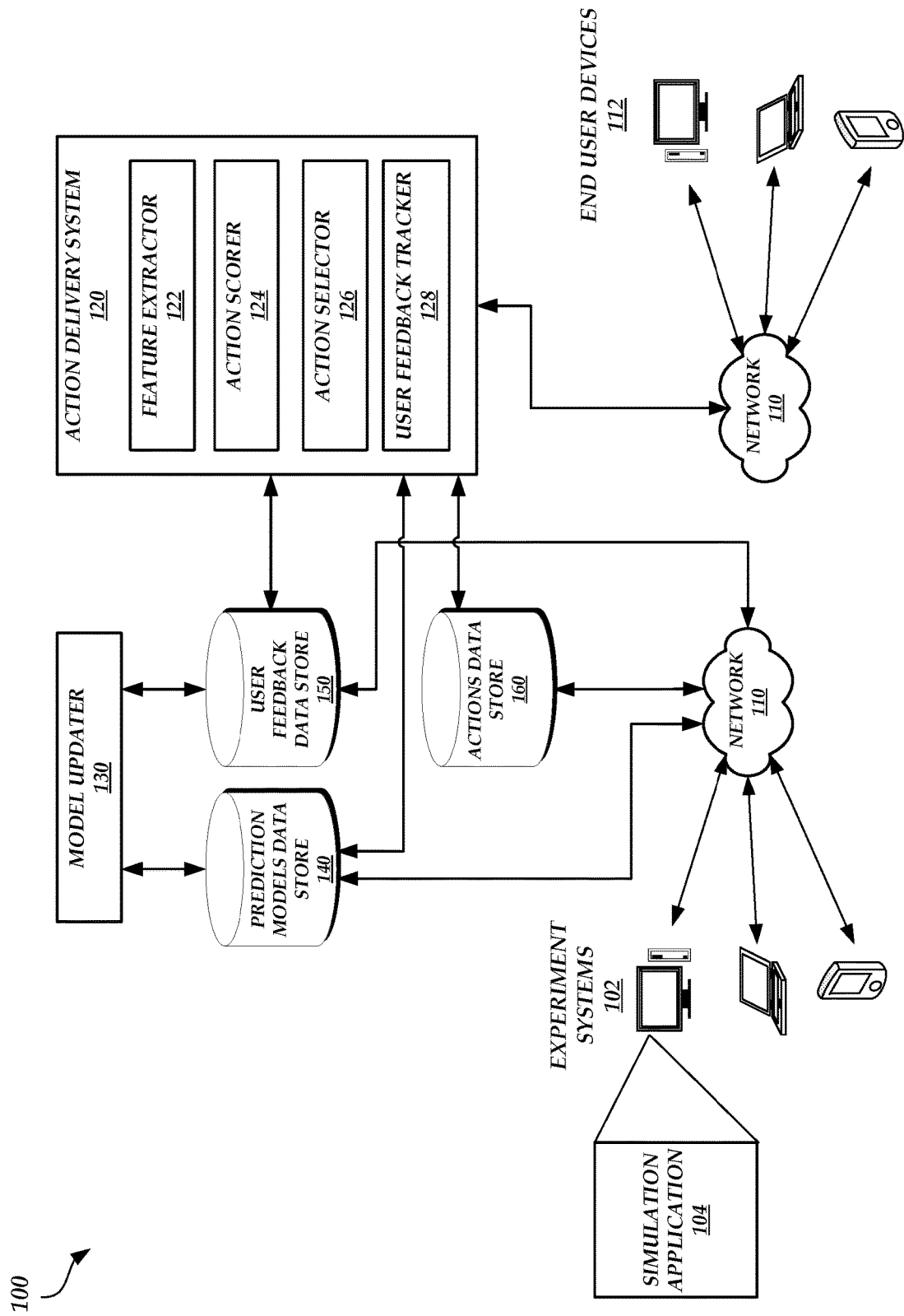
FIG. 1 is a block diagram of an illustrative operating environment in which a simulation application running on an experiment device uses data gathered and generated by an action delivery system and a model updater to test different action delivery policies, in one embodiment.

As described above, it can be difficult to identify valuable content to include in a content page in a timely manner and without losing users and/or otherwise degrading the user experience. For example, content may be considered more valuable if displaying the content results in a user click, a user purchase, a user opening another content page related to the displayed content, and/or the like. On the other hand, content may be considered less valuable if displaying the content results in no action, a user unsubscribing from an electronic mail list, a user indicating a dislike for the displayed content, and/or the like.

Typically, conventional content delivery systems use A/B testing to identify valuable content to display in a content page. For example, a conventional content delivery system may use a current policy to determine which content to include in a content page. However, an administrator operating the conventional content delivery system may wish to test a new policy. In response, the conventional content delivery system can split users into a "treatment" group and a "control" group. User devices operated by users in the treatment group are served content pages with content selected using the new policy, whereas user devices operated by users in the control group are served content pages with content selected using the current policy. The conventional content delivery system tracks user interactions with the served content pages, and the user interactions are ultimately used to determine which policy is more valuable (e.g., which policy leads to more user clicks, user purchases, content page openings, etc.).

However, these conventional content delivery systems that use A/B testing have several technical deficiencies. For example, A/B testing is conducted in a live or production conventional content delivery system (e.g., actual user devices, not simulated user devices, are sending page requests to the content delivery system). Thus, to use A/B testing, a conventional content delivery system requires fully-developed and production-ready code defining any new policies to test. In addition, tracking user interactions is a lengthy process. Given the lengthy process for tracking user interactions, the number of different experiments that can be conducted within a certain time period is limited because meaningful results generally require a large amount of user interactions. Moreover, because A/B testing is conducted in a live or production conventional content delivery system, if a new policy being tested is worse than a current policy (e.g., the new policy results in less valuable content being included in a content page more often than with the current policy), this can have a negative, irreversible impact on users. In some cases, the new policy could result in less network traffic, users unsubscribing from a service, and/or the like.

Accordingly, described herein is a testing environment in which offline simulations can be run to identify policies and/or prediction models that result in more valuable content being included in content pages. The offline simulations can be run in an application executed by an experiment device, or system of devices, using data gathered by a production content delivery system. By running simulations offline, the production content delivery system and the simulation application described herein are not subject to the same code requirements as with the conventional content delivery system. In addition, because the simulation application is not testing policies and/or prediction models in a production environment, the simulation application can test any number of different policies and/or prediction models in less time than the conventional content delivery system. In fact, the simulation application can test different policies and/or prediction models in parallel to further reduce the testing time. Moreover, because the simulation application is not testing policies and/or prediction models in a production environment, the possibility of any testing negatively impacting users is significantly reduced.

For clarity and breadth, the present disclosure describes the features of the production content delivery system and the simulation application in the context of "actions" and "contexts." As described herein, an "action" is an instruction to display certain content (e.g., a widget, an advertising campaign, an item, a title of an item, an image of an item, a description of an item, a button, a video, an audio player, etc.), an instruction not to display certain content, an instruction to display content in a certain manner, configuration, or format (e.g., in a specific color, with a specific type of border, with a certain background color, etc.), and/or a strategy for selecting content to display, for selecting content not to display, and/or for configuring or formatting content for display (e.g., use a specific machine learning algorithm to select content to display, select the top N ranked content corresponding to a particular time period to display, select a particular ranking algorithm to determine which content to display, etc.). Furthermore, a "context" or "contextual information" includes one or more features that are linearly and/or non-linearly derived from one or more environment and/or action features (e.g., the context features are based on the values of one or more environment and/or action features and/or based on one or more non-linear functions applied to the values of one or more environment and/or action features). Environment features can include user attributes associated with a visitor of a content page (e.g., user interests, user hobbies, user age, user gender, user purchase history, user search history and/or current search queries, user subscriptions, actions performed by the user in prior browsing sessions, parts of a screen a user typically clicks while browsing, etc.) and/or information about the state of the world (e.g., a time of day, a current season, a type of user device, a context of the current browsing session, etc.). Action features provide a static characterization of the actions and can include content and/or the configuration or format of content displayed in the content page, text describing the actions, and/or the like.

The foregoing aspects and many of the attendant advantages of this disclosure, including the above-referenced technical benefits, will become more readily appreciated as the same become better understood by reference to the following detailed description, when taken in conjunction with the accompanying drawings.

Example Action Delivery Testing Environment

FIG. 1 is a block diagram of an illustrative operating environment 100 in which a simulation application 104 running on an experiment device or system 102 uses data gathered and generated by an action delivery system 120 and a model updater 130 to test different action delivery policies, in one embodiment. The operating environment 100 includes the experiment device(s) or system 102, end user devices 112, the action delivery system 120, the model updater 130, prediction models data store 140, user feedback data store 150, and actions data store 160.

The action delivery system 120 (e.g., a content delivery system) may include various modules, components, data stores, and/or the like to identify an action to deliver to a user device 112 in response to an action request and to track user behavior. For example, the action delivery system 120 includes a feature extractor 122, an action scorer 124, an action selector 126, and a user feedback tracker 128.

In an embodiment, a user device 112 transmits an action request to the action delivery system 120 via network 110. As an example, the action request can be a content page request, and the action delivery system 120 can therefore use the action request to determine what individual content or combination of content should be displayed in a content page and/or how the individual content or content combination should be displayed in the content page. The action request may include contextual information, or may include a session ID or cookie that can be used to look up contextual information. Thus, the feature extractor 122 can extract features from the contextual information. The feature extractor 122 can generate a feature vector with the extracted features, where each element in the feature vector corresponds to a different extracted feature. The feature extractor 122 can then transmit the feature vector to the action scorer 124.

The action scorer 124 can retrieve a plurality of actions (or a plurality of action identifiers) from the actions data store 160. As described above, the actions can include instructions to display certain content, not to display certain content, and/or to display content in a certain manner and/or strategies for selecting content to display, for selecting content not to display, and/or for configuring or formatting content for display.

The action scorer 124 can also retrieve one or more prediction models from the prediction models data store 140. A prediction model can be trained using artificial intelligence, such as machine learning. Thus, a prediction model can also be referred to as a prediction machine learning model. The prediction model retrieved by the action scorer 124 can be a prediction model selected by an administrator or experiment operator, a prediction model associated with the user device 112 that submitted the action request, and/or the like.

A prediction model can take a feature vector and an action (or action identifier) as an input and produce an expected result as an output. In the example of content page requests, an expected result can include a user click, a user purchase, a user opening another content page related to the displayed content, no action, a user unsubscribing from an electronic mail list, a user indicating a dislike for the displayed content, and/or the like. The expected result can be represented as a numerical value, such as a value between 0 and 1. For expected results that are desirable (e.g., a user click, a user purchase, a user opening another content page related to the displayed content, etc.), a higher expected result value may indicate that the expected result is more likely to occur. For expected results that are less desirable (e.g., no action, a user unsubscribing from an electronic mail list, a user indicating a dislike for the displayed content, etc.), a lower expected result value may indicate that the expected result is more likely to occur.

In further embodiments, the expected result produced as an output by the prediction model is a vector in which elements of the vector include numerical values for different expected results. As an illustrative example, the expected result produced as an output by the prediction model can be a vector in which the first element includes a value associated with a user click result (e.g., a likelihood that a user will click a link associated with the action provided as an input to the prediction model), the second element includes a value associated with a user purchase result (e.g., a likelihood that a user will purchase an item associated with the action provided as an input to the prediction model), and the third element includes a value associated with a no action result (e.g., a likelihood that a user will not perform any action in response to the action provided as an input to the prediction model being enacted).

For each retrieved action (or action identifier), the action scorer 124 can generate a score by executing the retrieved prediction model, providing the respective action and the feature vector as an input to the prediction model. The score can be the expected result produced by the prediction model and/or an aggregated value determined based on the expected result (e.g., if the expected result is a vector of several values, the aggregated value can be an average of the values). The action scorer 124 can then send the scores to the action selector 126.

The actions (or action identifiers) stored in the actions data store 160 can each be associated with one or more policies. Each policy and action combination can be associated with one or more contexts, and each combination of policy, context, and action can be associated with an action probability. A policy can be probabilistic or deterministic. For example, a policy can be a map between a context and one or more actions, where the policy results in an action being selected given a certain context. As a result of implementing a policy, a respective action is selected a certain percentage of the time given a certain context. The percentage of time a certain action is selected given a certain context is also referred to herein as an "action probability." As an illustrative example, the result of implementing a first policy is that a first action is selected 80% of the time given a certain context, a second action is selected 10% of the time given the same context, a third action is selected 5% of the time given the same context, and so on. Thus, the action probability associated with a combination of the first policy, the context, and the first action is 80% or 0.80. Example policies include selecting an action at random, selecting an action at random that is associated with a score or rank above a threshold value, selecting an action that has the highest score or rank, and/or the like. The action probabilities can be stored in the user feedback data store 150 in association with various policies, contexts, and/or actions (or action identifiers).

The action selector 126 can be configured to use a certain policy in determining which action(s) to provide to a user device 112 given a certain context. For example, one group of user devices 112 can be associated with a first policy, a second group of user devices 112 can be associated with a second policy, and so on. Alternatively or in addition, an administrator or experiment operator can select a policy to use in determining which action(s) to provide to a user device 112. The action selector 126 can rank the actions based on the scores received from the action scorer 124, and select one of the ranked actions to provide to the user device 112. For example, the action selector 126 can select a ranked action based on the selected policy. As an illustrative example, the action selector 126 selects the highest ranked action if the selected policy indicates that the highest ranked action should be selected. The action selector 126 can then transmit the selected action and a prediction identifier or prediction ID to the user device 112 to satisfy the action request. In addition, the action selector 126 can store the selected action (or an identifier of the selected action) and/or the extracted features (or context) in the user feedback data store 150 in an entry associated with the prediction ID.

The user device 112 can receive an action and perform the action as instructed. For example, in the context of content page requests, the user device 112 can render a content page and display certain content, not display certain content, and/or display content in a certain way in the rendered content page in response to receiving an action.

As a result of performing the action, a user operating the user device 112 may or may not perform a resulting action. For example, in the context of content page requests, a user may click on a link in displayed content, a user may purchase an item depicted in the displayed content, a user may access a content page associated with an item depicted in the displayed content, a user may indicate a dislike for an item depicted in the displayed content, a user may perform no action, and/or the like. The user device 112 can track the behavior of the user and provide feedback to the action delivery system 120. For example, the user device 112 can track the behavior of the user, generate feedback data based on the behavior, and transmit the feedback data and the prediction ID to the user feedback tracker 128. The user feedback tracker 128 can then store the feedback data in the user feedback data store 150 in an entry associated with the prediction ID. Thus, the entry in the user feedback data store 150 associated with the prediction ID can include the extracted features, the selected action (or an identifier of the selected action), and the resulting user behavior (represented as feedback data).

The model updater 130 can be configured to update prediction models as user devices 112 provide feedback. For example, the model updater 130 can retrieve one or more prediction models from the prediction models data store 140. The model updater 130 can also retrieve entries from the user feedback data store 150 that each include extracted features, a selected action (or an identifier of a selected action), and the resulting user behavior. The data retrieved from the user feedback data store 150 can serve as training data such that the model updater 130 can re-train or update the retrieved prediction model(s) using each combination of extracted features, selected action, and resulting user behavior.

The model updater 130 can re-train or update a prediction model each time new entries are added to the user feedback data store 150, periodically in batches (e.g., after a certain number of entries have been added to the user feedback data store 150), at the request of an administrator or experiment operator (e.g., a user operating an experiment device or system 102), and/or the like. Thus, in the context of content page requests, as users operating user devices 112 interact with content pages delivered with or without certain content and provide feedback, the model updater 130 can update the prediction models to more accurately predict expected results, which ultimately improves the quality or value of future action selections made by the action selector 126.

While the action delivery system 120 and the model updater 130 operate in the production environment, the simulation application 104 running on an experiment system 102 can operate in a separate test environment to test different policies before such policies are used by the action delivery system 120 to provide actions in response to action requests. For example, an experiment operator can open the simulation application 104 and provide information, such as a new policy to test, a test context (e.g., a set of test context features represented as a feature vector), an existing policy to compare to the new policy, and/or a prediction model to use during the test. Alternatively, the experiment operator can instruct the simulation application 104 to retrieve a set of test context features (e.g., a set of extracted features) from the user feedback data store 150. While there may be little to no data gathered from user devices 112 in relation to use of the new policy, the simulation application 104 can use data associated with the existing policy to simulate how users of user devices 112 may respond if the action delivery system 120 used the new policy rather than the existing policy.

Once the information is provided, the experiment operator can initiate a test (e.g., by selecting a test operation, clicking a button, etc.). In response, the simulation application 104 accesses the prediction models data store 140 via the network 110 and retrieves the prediction model identified by the experiment operator. The simulation application 104 also retrieves one or more actions (or one or more action identifiers) from the actions data store 160 and action probabilities corresponding to combinations of actions, the text context, and the indicated existing policy from the user feedback data store 150. As used herein, retrieval of an action can include retrieving the instruction that represents an action or retrieving an identifier of the action. An identifier of an action can include data that identifies the result of an action. For example, if an action is an instruction to display a widget, then the action identifier may be data (e.g., a numerical value, text, an alphanumeric value, etc.) that indicates that a widget is displayed in a content page. In further embodiments, the simulation application 104 retrieves some, but not all, of the actions stored in the actions data store 160. For example, the simulation application 104 can retrieve only those actions that are associated with an action probability greater than a threshold value (e.g., zero). The simulation application 104 may limit the number of actions retrieved because actions associated with low action probabilities may not have been presented to users of end user devices 112 a sufficient number of times to accurately determine how users, in the aggregate, behave in response to being presented with such actions.

For each retrieved action, the simulation application 104 can generate a score by executing the retrieved prediction model, providing the respective action (or action identifier) and the test context as an input to the prediction model. The scores, however, may be biased given that certain actions are selected more often than others according to the existing policy. To more accurately simulate the new policy, the simulation application 104 may unbias the scores. Thus, the simulation application 104 can normalize the generated scores using the retrieved action probabilities and test action probabilities included in the new policy being tested (as provided by the experiment operator). For example, for each action's score, the simulation application 104 can divide the score by the retrieved action probability associated with the respective action, and multiply the result by the test action probability associated with the respective action. Each normalized score can represent the expected value of user behavior that is simulated to occur in response to the associated action being selected according to the new policy. In the context of content page requests, a normalized score can represent the expected value of user actions simulated to occur in response to the content associated with the normalized score being selected for display according to the new policy. Similarly, the originally generated scores can represent the values of user behavior that occurred in response to the associated actions being selected according to the existing policy.

The simulation application 104 can then compare the expected values of the new policy with the values of the existing policy, displaying the results of the comparison (e.g., in a user interface, on a wall via a projection, etc.) and/or storing the results. For example, the simulation application 104 can display the comparison as numerical results (e.g., a difference between the expected value of the new policy for a first action and the value of the existing policy for the first action, a difference between the expected value of the new policy for a second action and the value of the existing policy for the second action, and so on), in a graph (e.g., a bar graph that depicts the expected values of the new policy and the values of the existing policy for each retrieved action, a line graph, etc.), and/or the like. Alternatively or in addition, the simulation application 104 can present the results of the comparison other than by displaying the results (e.g., audibly via a speaker device, via a vibration created by a computing device, etc.) and/or can cause a presentation device (e.g., another experiment system 102, a user device 112, a monitor, a ticker, a projector, a speaker device, etc.) to present the results of the comparison (e.g., the simulation application 104 can transmit an instruction to the presentation device to present the results, where the instruction includes the results).

In further embodiments, the simulation application 104 can aggregate the expected values of the new policy and/or the values of the existing policy. For example, the simulation application 104 can average the expected values of the new policy to determine a single expected value of the new policy. Similarly, the simulation application 104 can average the values of the existing policy to determine a single value for the existing policy. The simulation application 104 can then present a comparison of the single expected value and the single value (e.g., by displaying the comparison, by projecting the comparison, by audibly indicating the comparison, by indicating the comparison via one or more vibrations, etc.), cause a presentation device to present the comparison, and/or store the comparison.

The simulation application 104 can repeat the above-described operations any number of times such that an experiment owner can see how the expected values and/or existing policy values change as prediction models are updated, as the type and/or number of actions change, policies change, and/or the like. In further embodiments, the simulation application 104 can repeat the above-described operations for any number of existing policies such that the experiment owner can compare the new policy to a plurality of existing policies.

Optionally, the simulation application 104 can simulate the new policy without comparing the new policy to an existing policy. Rather, the simulation application 104 can use data associated with an existing policy to simulate the new policy and determine expected values of the new policy. However, the simulation application 104 can continue to simulate the new policy as prediction models are updated, as the type and/or number of actions change, etc., to determine whether the expected value of the new policy increases or decreases over time. Such information may allow an experiment operator to adjust features of a new policy (e.g., action probabilities, a prediction model to use with the new policy, other parameters of the new policy, etc.) in an attempt to improve some or all of the expected values of the new policy (and therefore improve the likelihood that the action delivery system 120 would provide actions that are of more value to users of user devices 112).

As described above, the type and/or number of actions can change over time. In addition, the action probabilities of such actions can also change over time. Thus, the simulation application 104 can use the inverse propensity score process to determine an expected value of the new policy for a certain action over time. The simulation application 104 can use the following equation to implement the inverse propensity score process:

$$V_{IPS} = \frac{1}{T}\sum_{t=1}^{T} \frac{\pi(a_t \mid x_t)}{\pi_o(a_t \mid x_t)} r_t \tag{1}$$

where T represents the end of a period of time that starts at time 1, $\pi(a_t|x_t)$ represents the action probability for an action $a_t$ given a context $x_t$ according to the new policy, $\pi_o(a_t|x_t)$ represents the action probability for an action $a_t$ given a context $x_t$ according to the existing policy, and $r_t$ is a numerical representation of a user's expected behavior given the action $a_t$ and context $x_t$.

As an illustrative example of the inverse propensity score process, the simulation application 104 can receive a set of N data records (e.g., represented as $(x_n, a_n, r_n, \pi_n)$) (e.g., from the user feedback data store 150 and the action data store 160), where each data record includes a context vector $x_n \in X \subseteq R^M$, an action vector $a_n \in A \subset R^D$, a reward or resulting user behavior $r_n$, and a probability $\pi_n$ of selecting action $a_n$ according to a provided policy (e.g., as provided by an experiment operator) given the context vector $x_n$. The simulation application 104 may assume that the action space A has a finite cardinality (e.g., |A|=K, where there are K different content pieces $a_1$ to $a_k$ from which the simulation application 104 can select). To test a test policy v, where test policy v selects an action $a_n$ with a probability v(x,a), the simulation application 104 applies as an input (e.g., to a prediction model) the N data records and the test policy v. As a result, the simulation application 104 (e.g., the prediction model) initially sets a value for the variable "score" to 0. The simulation application 104 then, for each value of n from 1 to N, repeats the following equation: score=score+ $r_n*v(x_n,a_n)/\pi_n$. The simulation application 104 then divides the resulting score by N to produce the expected value of the test policy v. The following is a sample pseudo code for implementing the inverse propensity score process:

Input: $(x_1, a_1, r_1, \pi_1) \ldots (x_N, a_N, r_N, \pi_N)$, v
Output: expected_reward
reward=0
For n=1 to N do
reward=reward+$r_n*v(x_n, a_n)/\pi_n$
End
expected_reward=reward/N In other embodiments, the simulation application 104 can use other processes to determine expected values of a new policy. For example, instead of using the inverse propensity score process, the simulation application 104 could use a modified version of the inverse propensity score process that reduces variance, while introduced a small bias. The simulation application 104 can use the following equation to implement the modified inverse propensity score process:

$$V_{IPS} = \frac{1}{T}\sum_{t=1}^{T} \frac{\pi(a_t \mid x_t)}{\max\{\pi_o(a_t \mid x_t), \tau\}} r_t \qquad (2)$$

where $\tau$ represents an arbitrary small value.

Alternatively, the simulation application 104 could use a direct method to determine expected values of a new policy, in which the expected values of the new policy would be as follows:

$$V_{DM} = \frac{1}{T}\sum_{t=1}^{T}\sum_{a \in A} \pi(a \mid x_t)\hat{r}(x_t, a) \qquad (3)$$

where A represents the set of all actions, and where $\hat{r}(x_t,a)$ represents a numerical representation of a user's expected behavior given the action a and context $x_t$. To determine $\hat{r}(x_t,a)$, the simulation application 104 can train a regressor on the couples (a,x).

As another alternative, the simulation application 104 could use a doubly robust estimator process to determine expected values of a new policy, in which the expected values of the new policy would be as follows:

$$V_{DR} = \frac{1}{T}\sum_{t=1}^{T}\left(\hat{r}(x_t, \pi) + \frac{\pi(a_t \mid x_t)}{\pi_o(a_t \mid x_t)}(r_t - \hat{r}(x_t, a_t))\right) \qquad (4)$$

where $$\hat{r}(x, \pi) \text{ is } \sum_{a \in A} \pi(a \mid x)\hat{r}(a, x).$$

The doubly robust estimator process is a combination of the direct method and the inverse propensity score process, where the doubly robust estimator process is accurate if at least one of the direct method or the inverse propensity score process is accurate.

In some embodiments, the simulation application 104 can be used to compare and/or rank different prediction models. For example, the experiment operator can open the simulation application 104 and provide information, such as an existing policy, a test context (e.g., a set of test context features represented as a feature vector), a test prediction model, and an existing prediction model (or multiple existing prediction models). The simulation application 104 can then perform the operations described above using just the existing policy, repeating the operation once for the test prediction model and once for each existing prediction model. The simulation application 104 can compare, present, cause a presentation device to present, and/or store differences between expected values generated using the test prediction model and values (e.g., scores) generated using each of the existing prediction models. The simulation application 104 can further rank prediction models by, for example, aggregating expected values and/or values (e.g., averaging the expected values, averaging the values, etc.) and ranking the resulting aggregated values.

In further embodiments, the simulation application 104 can compare and/or rank different combinations of prediction models and policies. For example, the experiment operator can provide a test policy, one or more existing policies, a test prediction model, one or more existing prediction models, and a test context. The simulation application 104 can then perform the operations described above to compare and/or rank different combinations of prediction models and policies and present, cause a presentation device to present, and/or store corresponding results.

The action delivery system 120 and/or the model updater 130 may be a single computing device, or may include multiple distinct computing devices, such as computer servers, logically or physically grouped together to collectively operate as a server system. The components of the action delivery system 120 and/or the model updater 130 can each be implemented in application-specific hardware (e.g., a server computing device with one or more ASICs) such that no software is necessary, or as a combination of hardware and software. In addition, the modules and components of the action delivery system 120 and/or the model updater 130 can be combined on one server computing device or separated individually or into groups on several server computing devices. In some embodiments, the action delivery system 120 and/or the model updater 130 may include additional or fewer components than illustrated in FIG. 1.

In some embodiments, the features and services provided by the action delivery system 120 and/or the model updater 130 may be implemented as web services consumable via the communication network 110. In further embodiments, the action delivery system 120 and/or the model updater 130 are provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The prediction models data store 140 stores various prediction models (e.g., machine learning models for predicting a user behavior given a set of extracted features and an action). While the prediction models data store 140 is depicted as being located external to the action delivery system 120 and the model updater 130, this is not meant to be limiting. For example, in other embodiments not shown, the prediction models data store 140 is located internal to at least one of the action delivery system 120 and the model updater 130.

The user feedback data store 150 stores entries that include or identify extracted features, a selected action (or an identifier of a selected action), and the resulting user behavior. The user feedback data store 150 further stores action probabilities associated with different extracted features and/or actions. Each action probability associated with an action may correspond to a different policy. While the user feedback data store 150 is depicted as being located external to the action delivery system 120 and the model updater 130, this is not meant to be limiting. For example, in other embodiments not shown, the user feedback data store 150 is located internal to at least one of the action delivery system 120 and the model updater 130.

The actions data store 160 stores actions (and/or action identifiers). While the actions data store 160 is depicted as being located external to the action delivery system 120 and the model updater 130, this is not meant to be limiting. For example, in other embodiments not shown, the actions data store 160 is located internal to at least one of the action delivery system 120 and the model updater 130.

While the action delivery system 120, the model updater 130, the prediction models data store 140, the user feedback data store 150, and the actions data store 160 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the experiment systems 102 and/or one or more of the user devices 112 via the network 110.

Various example experiment systems 102 and user devices 112 are shown in FIG. 1, including a desktop computer, laptop, and a mobile phone, each provided by way of illustration. In general, the experiment systems 102 and the user devices 112 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In one embodiment, the action delivery system 120 provides the experiment systems 102 and/or the user devices 112 with one or more user interfaces, command-line interfaces (CLI), application programing interfaces (API), and/or other programmatic interfaces for requesting actions, requesting prediction models, requesting action probabilities, providing feedback data, and/or the like. For example, the simulation application 104 running on an experiment system 102 can interface with the action delivery system 120, the prediction models data store 140, and/or the actions data store 160. In other embodiments, an experiment system 102 includes a collection of physical computing devices.

In some embodiments, the network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. In some embodiments, the network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Example Block Diagram for Selecting an Action

Figure 2A:
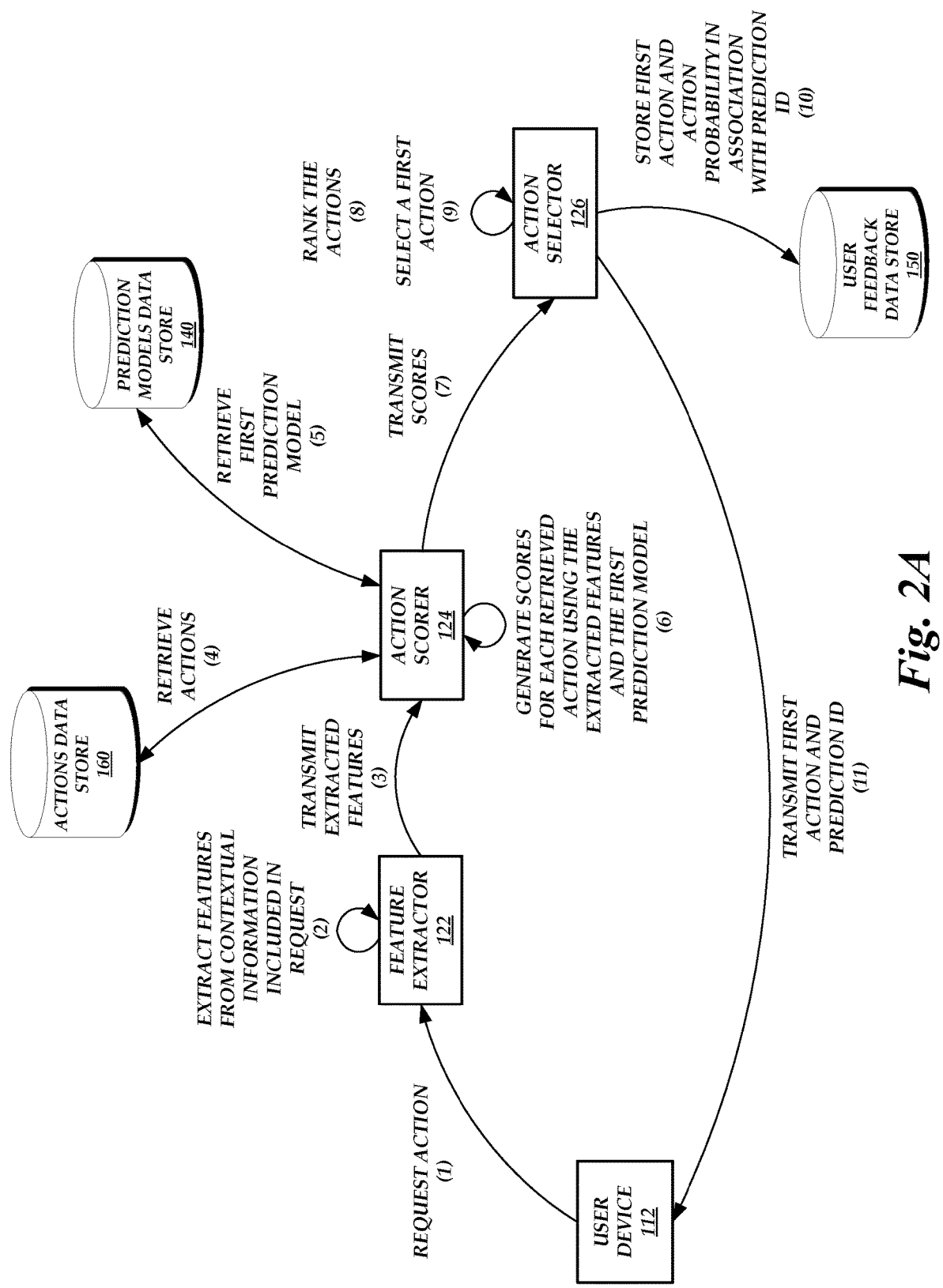
FIG. 2A is a block diagram of the operating environment of FIG. 1 illustrating the operations performed by the components of the operating environment to select an action, according to one embodiment.

FIG. 2A is a block diagram of the operating environment 100 of FIG. 1 illustrating the operations performed by the components of the operating environment 100 to select an action, according to one embodiment. As illustrated in FIG. 2A, the user device 112 transmits a request for an action at (1) to the feature extractor 122. For example, the request can be a content page request, and the user device 112 can expect to receive an indication of content to display in a user interface and/or an indication of how to display the content in response. In an embodiment, the request includes contextual information.

The feature extractor 122 can identify or "extract" features from the contextual information included in the request at (2). For example, the feature extractor 122 can generate a feature vector, with each element in the feature vector including a value representing an extracted feature. The feature extractor 122 can then transmit the extracted features (e.g., the feature vector) to the action scorer 124 at (3).

The action scorer 124 can retrieve actions from the actions data store 160 at (4). The action scorer 124 can further retrieve a first prediction model from the prediction models data store 140 at (5). For example, an experiment operator may have indicated that the first prediction model should be used to select an action in response to an action request. As another example, the user device 112 may be associated with the first prediction model.

The action scorer 124 can then generate scores for each retrieved action using the extracted features and the first prediction model at (6). For example, for each retrieved action, the action scorer 124 can provide the extracted features and the respective retrieved action as an input to the first prediction model, and the first prediction model returns a score (e.g., an expected user behavior) in response. The action scorer 124 can transmit the scores to the action selector 126 at (7).

The action selector 126 can rank the actions at (8) using the scores. For example, the action selector 126 can rank the actions from highest score to lowest score (if, for example, a higher score indicates that it is more likely a user will react positively to the respective action being selected, where a positive reaction can include a user click, a user purchase, a user opened a related content page, etc.). Once the actions are ranked, the action selector 126 can select a first action among the ranked actions at (9). The action selector 126 can select the first action according to a policy selected by an experiment operator, a policy associated with the user device 112, etc.

After selecting the first action, the action selector 126 stores the first action (or an identifier thereof) and a corresponding action probability (e.g., as computed or calculated by the action selector 126 based on the policy selected by an experiment operator, the policy associated with the user device 112, etc.) in the user feedback data store 150 in an entry associated with a prediction ID at (10). In further embodiments, the action selector 126 also stores the extracted features in the entry associated with the prediction ID. The action selector 126 can further transmit the first action (or an identifier thereof) and the prediction ID to the user device 112 at (11) to satisfy the action request.

Figure 2B:
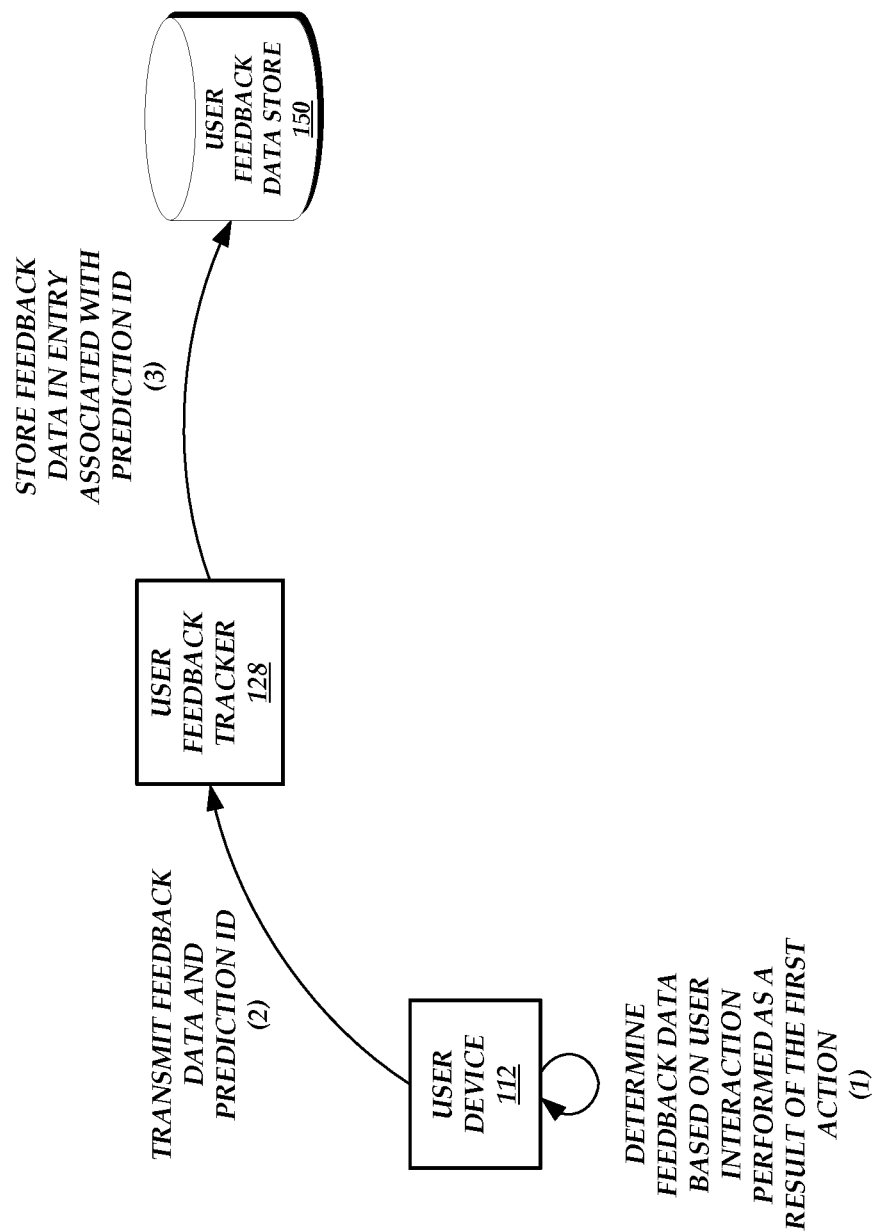
FIG. 2B is a block diagram of the operating environment of FIG. 1 illustrating the operations performed by the components of the operating environment to obtain user feedback, according to one embodiment.

FIG. 2B is a block diagram of the operating environment 100 of FIG. 1 illustrating the operations performed by the components of the operating environment 100 to obtain user feedback, according to one embodiment. As illustrated in FIG. 2B, the user device 112 has received the first action (or an identifier thereof). In the context of a content page request, the user device 112 has displayed a user interface depicting a content page in which the content page includes content indicated by the first action and/or includes content depicted in a certain manner as indicated by the first action. As an illustrative example, the first action can include an instruction to display a widget in the upper right-hand corner of a content page. Accordingly, upon receipt of the first action, the user device 112 can retrieve the widget and display the content page in a user interface, where the widget is displayed in the upper right-hand corner of the content page. The content page may further include other content retrieved by the user device 112.

Once the content page is displayed, a user may begin interacting with the content page (e.g., clicking links, scrolling, swiping, selecting menu items, entering text, etc.). The user device 112 can track the user interactions and determine feedback data based on user interaction performed as a result of the first action at (1). For example, in response to a display of the widget, the user may select a link in the widget, close the widget, perform no action, request a different content page, etc. Thus, the feedback data can include the user's interaction with a content page that includes the widget.

The user device 112 transmits the feedback data and the prediction ID previously received from the action selector 126 to the user feedback tracker 128 at (2). The user feedback tracker 128 then stores the feedback data in the user feedback data store 150 in the entry associated with the received prediction ID at (3). Thus, the feedback data can be stored in association with the extracted features and selected action that resulted in the feedback.

Example Block Diagram for Updating a Prediction Model

Figure 3:
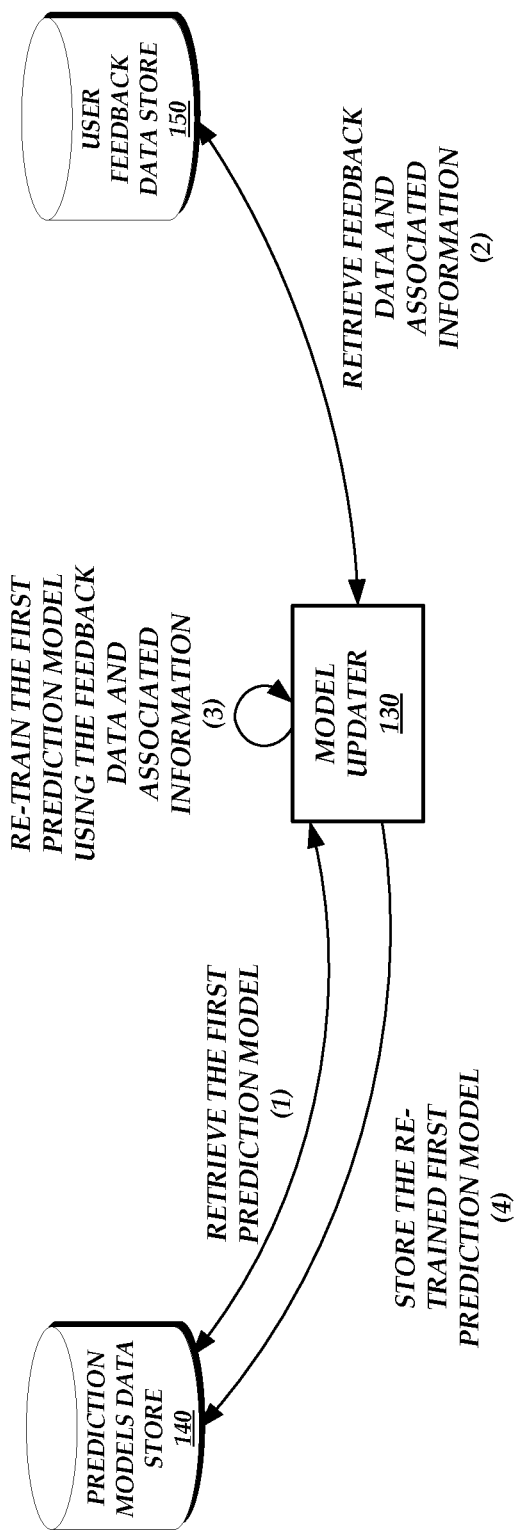
FIG. 3 is a block diagram of the operating environment of FIG. 1 illustrating the operations performed by the components of the operating environment to update a prediction model, according to one embodiment.

FIG. 3 is a block diagram of the operating environment 100 of FIG. 1 illustrating the operations performed by the components of the operating environment 100 to update a prediction model, according to one embodiment. As illustrated in FIG. 3, the model updater 130 retrieves the first prediction model from the prediction models data store 140 at (1). The model updater 130 can further retrieve feedback data and associated information (e.g., extracted features and selected action) from the user feedback data store 150 at (2).

The model updater 130 can then re-train the first prediction model using the feedback data and associated information at (3). For example, the extracted features and selected action can serve as training inputs and the feedback data can serve as known outputs, and the model updater 130 can use these distinctions to re-train or otherwise update the first prediction model. The model updater 130 can then store the re-trained first prediction model in the prediction models data store 140 at (4). The model updater 130 can repeat these operations for any number of prediction models stored in the prediction models data store 140.

Example Block Diagram for Performing an Offline Policy and/or Model Simulation

Figure 4:
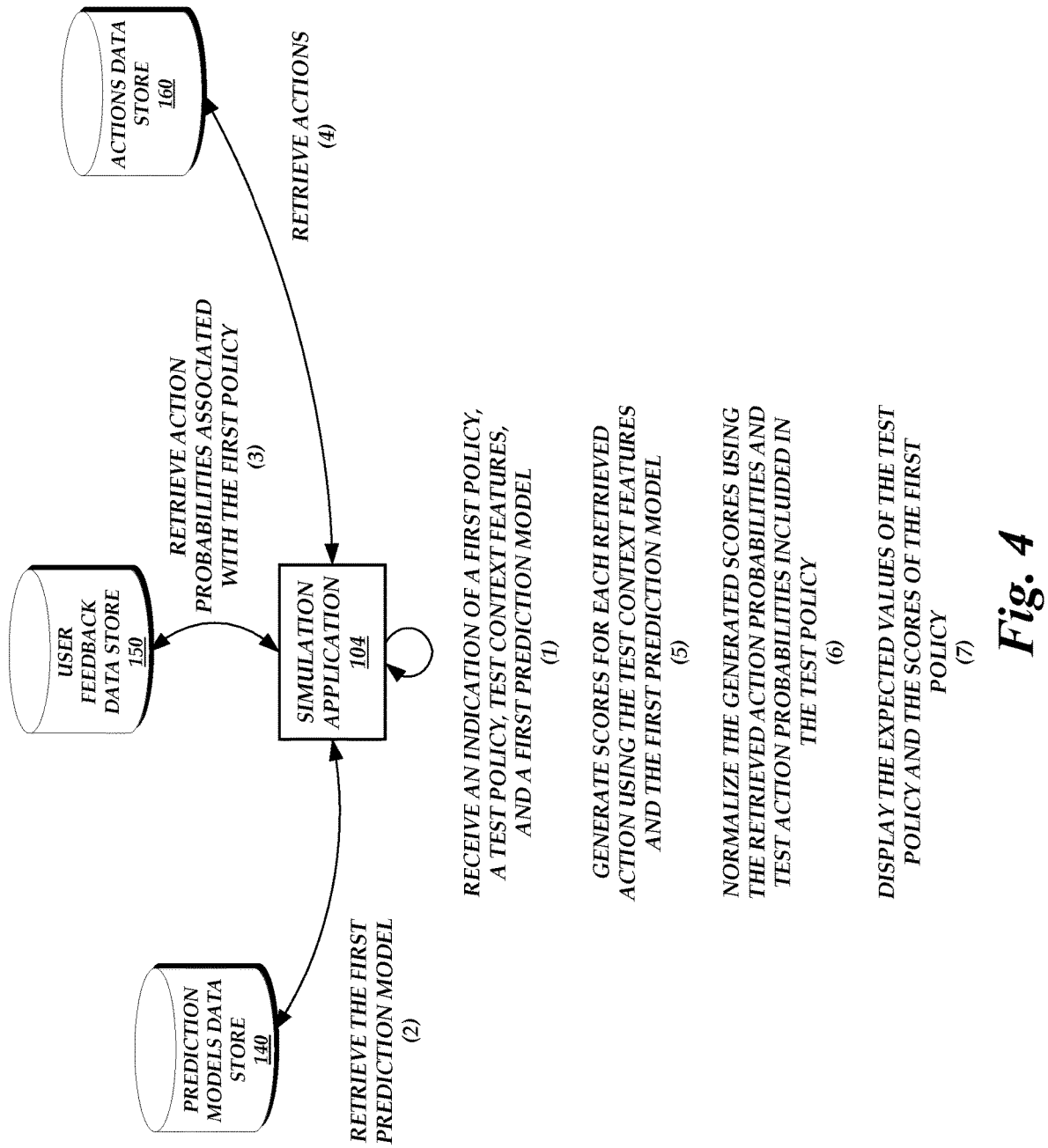
FIG. 4 is a block diagram of the operating environment of FIG. 1 illustrating the operations performed by the components of the operating environment to perform an offline policy and/or prediction model simulation, according to one embodiment.

FIG. 4 is a block diagram of the operating environment 100 of FIG. 1 illustrating the operations performed by the components of the operating environment 100 to perform an offline policy and/or prediction model simulation, according to one embodiment. For simplicity, the operations depicted in FIG. 4 are directed testing or simulating a new policy. However, similar operations can be performed to test or simulate a new prediction model and/or to test a combinations of new policies and/or new prediction models.

As illustrated in FIG. 4, the simulation application 104 receives an indication of a first policy, a test policy, text context features, and a first prediction model at (1). For example, the simulation application 104 receives the indications from an experiment operator via an input device of an experiment system 102. In response, the simulation application 104 retrieves the first prediction model from the prediction models data store 140 at (2). The simulation application 104 further retrieves action probabilities that are associated with the first policy from the user feedback data store 150 at (3) and retrieves corresponding actions (or action identifiers) from the actions data store 160 at (4). As described herein, the simulation application 104 may use the action probabilities to determine which actions to retrieve from the actions data store 160. For example, the simulation application 104 may retrieve actions that have action probabilities greater than a threshold value.

The simulation application 104 can then simulate how the test policy may affect user behavior if the test policy were to be implemented by the action delivery system 120. For example, the simulation application 104 can generate scores for each retrieved action using the test context features and the first prediction model at (5). In particular, the simulation application 104, for each retrieved action, can provide the test context features and the respective action as an input to the first prediction model, and the first prediction model returns the score for the respective action.

The simulation application 104 can then normalize the generated scores using the retrieved action probabilities and test action probabilities included in the test policy at (6). For example, the simulation application 104 can use the direct method, the inverse propensity score process, or the doubly robust estimator process to perform the normalization and obtain expected values of the test policy.

Optionally, the simulation application 104 displays the expected values of the test policy and the scores of the first policy at (7). The values can be displayed textually, graphically, and/or any combination thereof. Alternatively or in addition, the simulation application 104 can present the expected values of the test policy and/or the scores of the first policy in a different manner (e.g., audibly via a speaker device, via a vibration, etc.), cause a presentation device to present the expected values of the test policy and/or the scores of the first policy, and/or store the expected values of the test policy and/or the scores of the first policy.

Example Test Policy Simulation Routine

Figure 5:
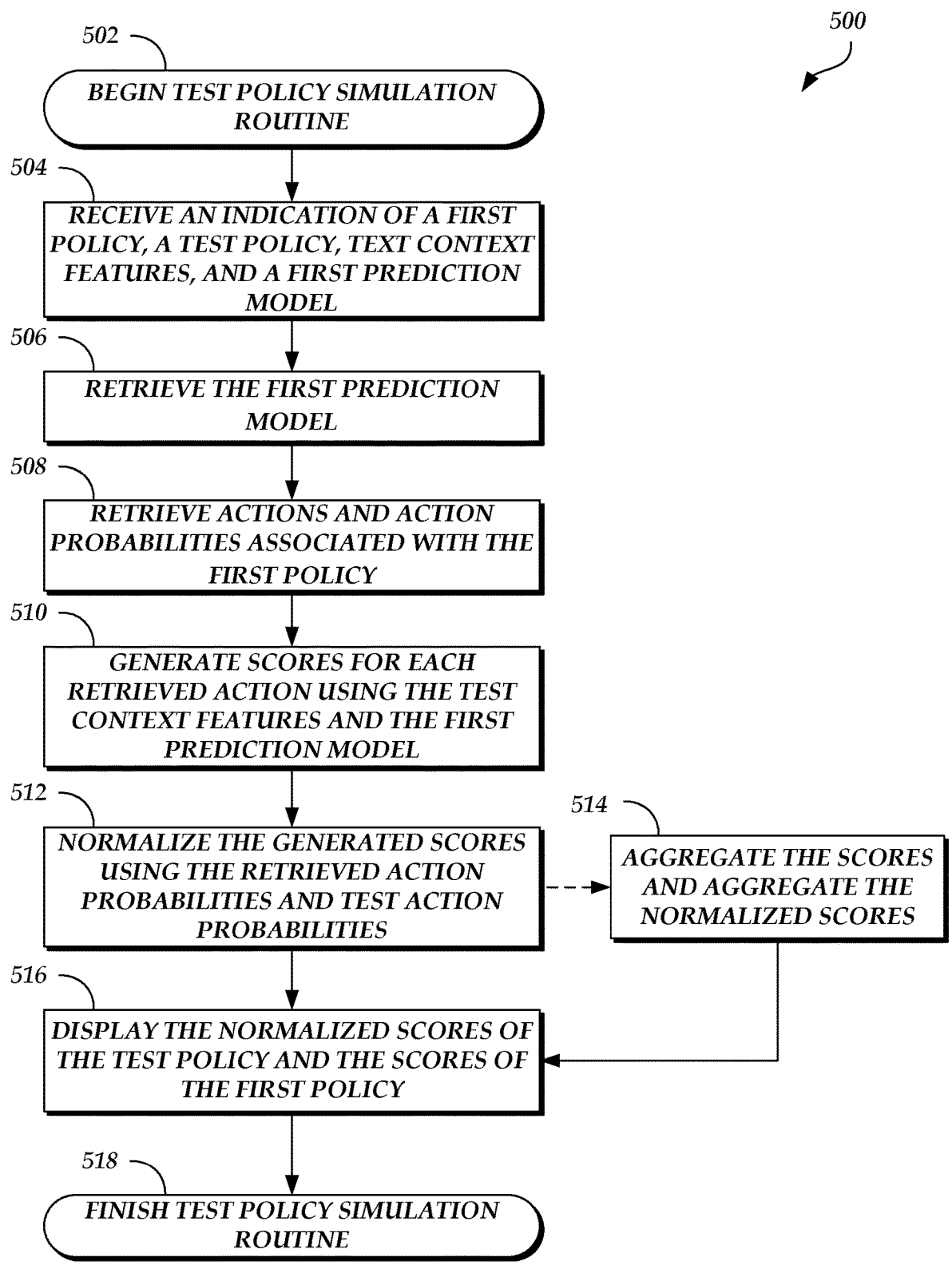
FIG. 5 is a flow diagram depicting a test policy simulation routine illustratively implemented by an experiment device, according to one embodiment.

FIG. 5 is a flow diagram depicting a test policy simulation routine 500 illustratively implemented by an experiment device, according to one embodiment. As an example, the experiment system 102 of FIG. 1 can be configured to run a simulation application 104 that executes the test policy simulation routine 500. As described above, the test policy simulation routine 500 can be run in an offline environment such that the test policy simulation routine 500 does not negatively impact the operation of a production action delivery system, such as the action delivery system 120. The test policy simulation routine 500 begins at block 502.

At block 504, an indication of a first policy, a test policy, text context features, and a first prediction model are received. For example, the indications can be provided by an experiment operator via an input device of the experiment system 102.

At block 506, the first prediction model is retrieved. For example, the first prediction model can be retrieved from the prediction models data store 140.

At block 508, actions and action probabilities of those actions that are associated with the first policy are retrieved. For example, this information can be retrieved from the user feedback data store 150 and the actions data store 160. In a further embodiment, only those actions that have an action probability greater than a threshold value (e.g., 0, 0.2, 0.4, etc.) are retrieved.

At block 510, scores for each retrieved action are generated using the test context features and the first prediction model. For example, the simulation application 104 provides the test context features and a respective action as inputs to the first prediction model, resulting in a score that represents an expected value of user behavior if the first policy is implemented.

At block 512, the generated scores are normalized using the retrieved action probabilities and test action probabilities included in the test policy. For example, the simulation application 104 can use the direct method, the inverse propensity score process, or the doubly robust estimator process to perform the normalization. The normalized scores represent expected values of user behavior if the test policy is implemented.

Optionally, the test policy simulation routine 500 can proceed to block 514 after block 512 and before proceeding to block 516. At block 514, the scores are aggregated and the normalized scores are aggregated (e.g., the scores are averaged and the normalized scores are averaged), resulting in an aggregate score and an aggregate normalized score. The aggregate score can represent an overall value of the first policy and the aggregate normalized score can represent an overall value of the test policy. After the aggregation is complete, the test policy simulation routine 500 proceeds to block 516.

At block 516, the normalized scores of the test policy and the scores of the first policy are displayed. Optionally, the aggregate normalized score and the aggregate score are displayed. Thus, the experiment operator can visually identify differences between the first policy and a test policy, and how the test policy would be expected to perform if implemented by the action delivery system 120. Alternatively or in addition, the simulation application 104 presents the normalized scores, the scores, the aggregate normalized score, and/or the aggregate score in a different manner (e.g., audibly via a speaker device, via a vibration, etc.), causes a presentation device to present the normalized scores, the scores, the aggregate normalized score, and/or the aggregate score, and/or stores the normalized scores, the scores, the aggregate normalized score, and/or the aggregate score locally and/or in a remote data store. After displaying the normalized scores and the scores, the test policy simulation routine 500 ends, as shown at block 518.

In further embodiments, blocks 512, 514, and/or 516 can be repeated for different existing policies such that these policies can also be compared to the test policy. Alternatively or in addition, blocks 510, 512, 514, and/or 516 can be repeated for different prediction models, including a test prediction model that has or has not been implemented by the action delivery system 120. Thus, the simulation application 104 can simulate different combinations of test prediction models, existing prediction models, test policies, and/or existing policies.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
    a production content delivery system comprising computer hardware, the production content delivery system configured to use a first policy and a first prediction model to programmatically select content to serve to user devices in response to content page requests received from the user devices; and
    a computing system comprising a processor and computer-executable instructions, wherein the computer-executable instructions, when executed, cause the computing system to execute a simulation application that:
        obtains an indication of the first policy, an indication of a test policy, an indication of test context features, and an indication of the first prediction model, wherein the first policy comprises first action probabilities, individual first action probabilities being associated with an action in a plurality of actions, and wherein the test policy comprises test action probabilities, individual test action probabilities being associated with an action in the plurality of actions;
        for individual actions in the plurality of actions, applies the test context features and the respective action as an input to the first prediction model to generate a score;
        for individual scores, normalizes the respective score using the first action probabilities and the test action probabilities; and
        outputs the scores in association with the first policy and the normalized scores in association with the test policy, wherein the normalized scores represent expected user behavior in response to the production content delivery system implementing the test policy;
    wherein the computing system executes the simulation application on computer hardware that is separate from the computer hardware of the production content delivery system, such that execution of the simulation application does not negatively impact operation of the production content delivery system.

2. The system of claim 1, wherein the computer-executable instructions, when executed, further cause the computing system to execute a simulation application that:
    obtains an indication of a test prediction model;
    for individual actions in the plurality of actions, applies the test context features and the respective action as an input to the test prediction model to generate a test score;

for individual test scores, normalizes the respective test score using the first action probabilities and the test action probabilities; and displays the scores in association with the first policy and the first prediction model, the test scores in association with the first policy and the test prediction model, the normalized scores in association with the test policy and the first prediction model, and the normalized test scores in association with the test policy and the test prediction model.

3. The system of claim 1, wherein the computer-executable instructions, when executed, further cause the computing system to execute a simulation application that, for individual scores, normalizes the respective score using at least one of a direct method, an inverse propensity score process, or a doubly robust estimator process.

4. The system of claim 1, wherein the test context features comprise a feature vector, and wherein individual elements in the feature vector include a different environment or action feature.

5. The system of claim 1, wherein the first prediction model is associated with a first time, wherein the first prediction model is updated based on user feedback at a second time, and wherein the computer-executable instructions, when executed, further cause the computing system to execute a simulation application that:

obtains the updated first prediction model;

for individual actions in the plurality of actions, applies the test context features and the respective action as an input to the updated first prediction model to generate an updated score;

for individual updated scores, normalizes the respective updated score using the first action probabilities and the test action probabilities;

displays the normalized scores in association with the test policy and the first time; and displays the updated normalized scores in association with the test policy and the second time.

6. A computer-implemented method comprising:

obtaining, by a computing system that runs a simulation application, an indication of a first policy, an indication of a test policy, an indication of test context features, and an indication of a first prediction model, wherein the first policy comprises first action probabilities, individual first action probabilities being associated with an action in a plurality of actions, and wherein the test policy comprises test action probabilities, individual test action probabilities being associated with an action in the plurality of actions, wherein the first policy and first prediction model are used by a production content delivery system comprising computer hardware to select content to deliver to user devices in response to content requests, and the computing system comprises computer hardware that is separate from the computer hardware of the production content delivery system; and by execution of the simulation application by said computer hardware of the computing system:

for individual actions in the plurality of actions, generating a score using the test context features, the respective action, and the first prediction model;

for individual scores, normalizing the respective score using the first action probabilities and the test action probabilities; and causing the scores to be presented on a presentation device in association with the first policy and the normalized scores to be presented on the presentation device in association with the test policy, wherein the normalized scores represent user behavior expected to occur if the production content delivery system implements the test policy.

7. The computer-implemented method of claim 6, further comprising, by execution of the simulation application by said computer hardware of the computing system:

obtaining an indication of a test prediction model;

for individual actions in the plurality of actions, generating a test score using the test context features, the respective action, and the test prediction model;

for individual test scores, normalizing the respective test score using the first action probabilities and the test action probabilities; and causing the scores to be presented on the presentation device in association with the first policy and the first prediction model, the test scores to be presented on the presentation device in association with the first policy and the test prediction model, the normalized scores to be presented on the presentation device in association with the test policy and the first prediction model, and the normalized test scores to be presented on the presentation device in association with the test policy and the test prediction model.

8. The computer-implemented method of claim 6, wherein, for individual actions in the plurality of actions, generating a score using the test context features, the respective action, and the first prediction model further comprises, for individual actions in the plurality of actions, applying the test context features and the respective action as an input to the first prediction model to generate a score.

9. The computer-implemented method of claim 6, wherein, for individual scores, normalizing the respective score using the first action probabilities and the test action probabilities further comprises, for individual scores, normalizing the respective score using at least one of a direct method, an inverse propensity score process, or a doubly robust estimator process.

10. The computer-implemented method of claim 6, wherein the test context features comprises a feature vector, and wherein individual elements in the feature vector include a different environment or action feature.

11. The computer-implemented method of claim 10, wherein the context features comprise at least one of attributes of a user operating a user device, a time of day, a current season, or a category of an item displayed in a content page.

12. The computer-implemented method of claim 6, wherein the first prediction model is associated with a first time, and wherein the first prediction model is updated based on user feedback at a second time.

13. The computer-implemented method of claim 12, further comprising:

obtaining the updated first prediction model;

for individual actions in the plurality of actions, generating an updated score using the test context features, the respective action, and the updated first prediction model;

for individual updated scores, normalizing the respective updated score using the first action probabilities and the test action probabilities;

causing the normalized scores to be presented on the presentation device in association with the test policy and the first time; and causing the updated normalized scores to be presented on the presentation device in association with the test policy and the second time.

14. The computer-implemented method of claim 6, wherein the plurality of actions comprise at least one of an instruction to display first content, an instruction not to display the first content, an instruction to display the first content in a first configuration, a strategy for selecting which content to display, a strategy for selecting which content not to display, or a strategy for configuring or formatting the first content for display.

15. The computer-implemented method of claim 6, further comprising:
   aggregating the scores to form an aggregated score;
   aggregating the normalized scores to form an aggregated normalized score; and
   causing the aggregated score to be presented on the presentation device in association with the first policy and the aggregated normalized score in association with the test policy.

16. The computer-implemented method of claim 6, wherein at least one of the first action probabilities is greater than a threshold probability value.

17. Non-transitory, computer-readable storage media comprising computer-executable instructions for testing policies prior to implementation in a production environment comprising computer hardware, wherein the computer-executable instructions, when executed by a computer system comprising computer hardware that is separate from the computer hardware of the production environment, cause the computer hardware of the computer system to execute a simulation application that performs operations comprising:
   obtaining an indication of a first policy used in the production environment to select content to deliver to user devices, an indication of a test policy not used in the production environment, an indication of test context features, and an indication of a first prediction model used in the production environment;
   for individual actions in a plurality of actions, generating a score using the test context features, the respective action, and the first prediction model;
   for individual scores, normalizing the respective score using probabilities associated with the first policy and the test policy, said normalized scores representing a measure of how the production environment will perform if the test policy is used by the production environment; and
   storing the scores in association with the first policy and the normalized scores in association with the test policy.

18. The non-transitory, computer-readable storage media of claim 17, wherein the simulation application further performs operations comprising:
   obtaining an indication of a test prediction model;
   for individual actions in the plurality of actions, generating a test score using the test context features, the respective action, and the test prediction model;
   for individual test scores, normalizing the respective test score using the probabilities associated with the first policy and the test policy; and
   storing the scores in association with the first policy and the first prediction model, the test scores in association with the first policy and the test prediction model, the normalized scores in association with the test policy and the first prediction model, and the normalized test scores in association with the test policy and the test prediction model.

19. The non-transitory, computer-readable storage media of claim 17, wherein the simulation application further performs operations comprising, for individual actions in the plurality of actions, applying the test context features and the respective action as an input to the first prediction model to generate a score.

20. The non-transitory, computer-readable storage media of claim 17, wherein the simulation application further performs operations comprising, for individual scores, normalizing the respective score using at least one of a direct method, an inverse propensity score process, or a doubly robust estimator process.

* * * * *